INVENTOR.
Ralph L. Abos

3,047,145
THREE DIMENSIONAL PARTICLE SIZE CLASSIFIER
Ralph L. Abos, Whittier, Calif., assignor to Polycarbide Corporation, a corporation of California
Filed Oct. 3, 1960, Ser. No. 59,884
8 Claims. (Cl. 209—12)

The invention relates to sorting and classifying apparatus for granular or particulate material with special reference to the classifying of fused tungsten carbide.

In the production of fused tungsten carbide for hard facing of various tools, bits, and equipment the tungsten carbide particles in granular form are popularly enclosed in a tubular steel welding rod and applied by welding to the surface to be hard-faced. In this welding process the tungsten carbide particles are deposited in a milder steel matrix, the matrix material coming from the welding rod and also from the parent part to which the material is applied. Some alloying of the tungsten carbide granules to the parent metal takes place. Where the tungsten carbide particles are of substantial three-dimensional size, as contrasted to thin flakes, this alloying does little or no damage. However, flakes will alloy with the parent metal with two main disadvantages. First, the effect of the tungsten carbide is dissipated, and secondly, the matrix metal is embrittled. It is, accordingly, highly desirable that the tungsten carbide particles used for this and other similar purposes be of generally rhombic, cubical, spherical or substantially three-dimensional form.

Heretofore, fused tungsten carbide has been formed in various cast ingot forms and then passed through a crusher and screen classifier. Screens, however, will classify according to greatest dimension and will not discriminate between flakes and more solid or rhombic particles. It is accordingly an object of the present invention to provide a classifying system of the character described which will deliver full-sized three-dimensional particles according to determined classification and will eliminate in the classifying process flakes, slivers, and other similar thin, flat particles.

Another object of the present invention is to provide a three-dimensional particle size classifier and associated structure which is designed for continuous production of classified tungsten carbide particles thereby realizing a high volume output with a modest use of equipment.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (six sheets):

Figure 6:
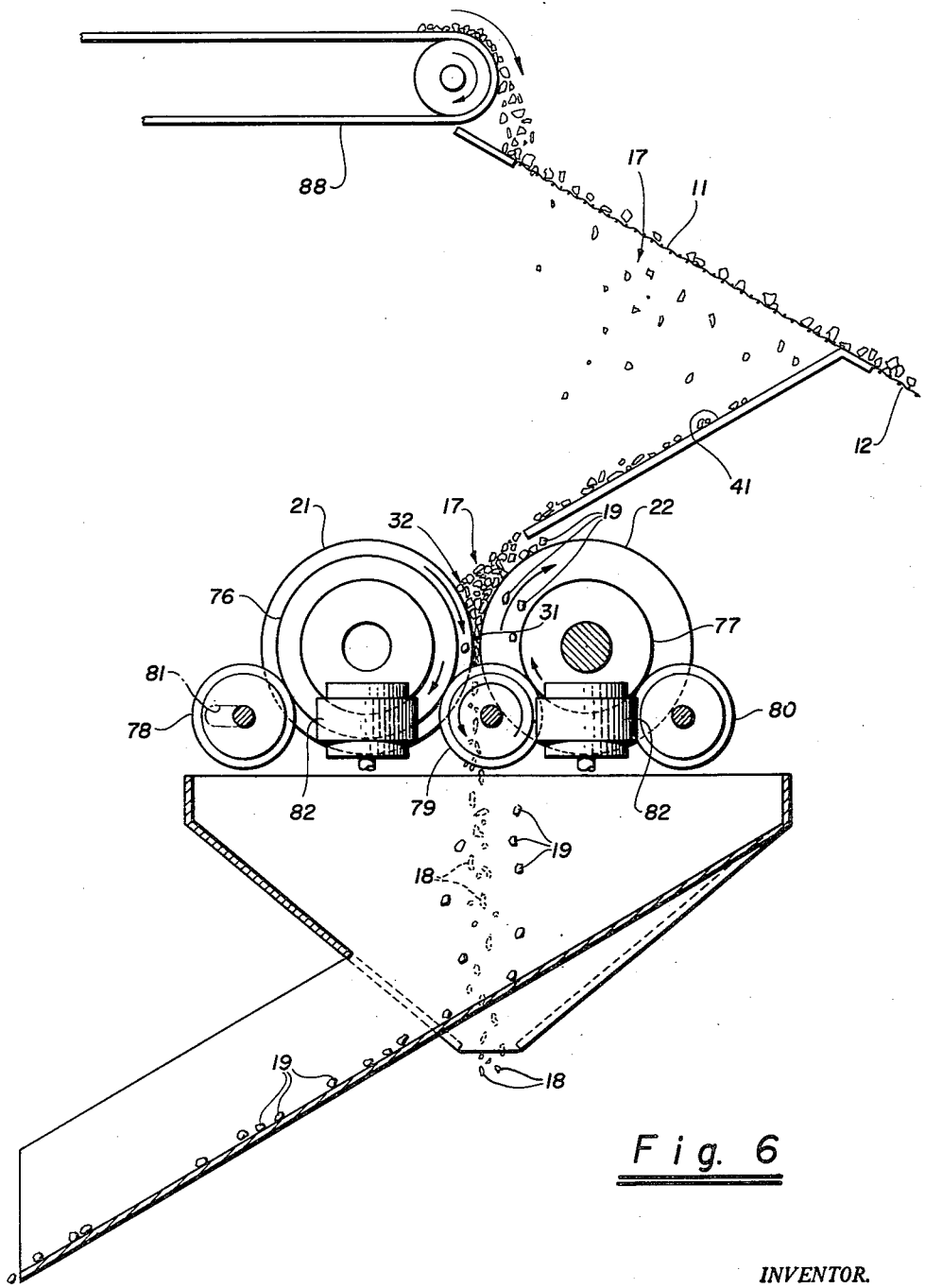
FIGURE 6 is a diagrammatic end elevation, partially in section, of a portion of the apparatus.

The three dimensional particle size classifier of the present invention consists briefly of a combination as illustrated in FIGURE 6 including a material classifying screen 11 passing therethrough particles 17 each having two of its three dimensions smaller than a first pre-determined size as determined by the openings in the screen, and a pair of rollers 21 and 22 mounted to receive therebetween the particles 17 passing through the screen and being spaced by a dimension 31 to pass therebetween particles 18 having any one of its three dimensions less than a second predetermined size as set by spacing 31 less than the first pre-determined size set by screen 11, whereby particles 19 retained on the rollers will have two out of three dimensions graded between these two limits and all of its dimensions greater than the second limit, thereby eliminating from the retained material all flakes and slivers having a minimum dimension less than the second spacing. Preferably, and as here shown, the rollers 21 and 22 are mounted in substantially horizontal and substantially parallel relation so as to define a vortex 32 therebetween for receiving in the vortex the material 17 passing through the screen 11; and drive means is provided for rotating at least one of the rollers, here roller 21 in a direction, see FIGURE 6, elevating and tumbling the material in the vortex so as to constantly reorient the particles for an opportunity to pass down through the spacing 31 where the minimum dimension of the particle will so permit.

Figure 1:
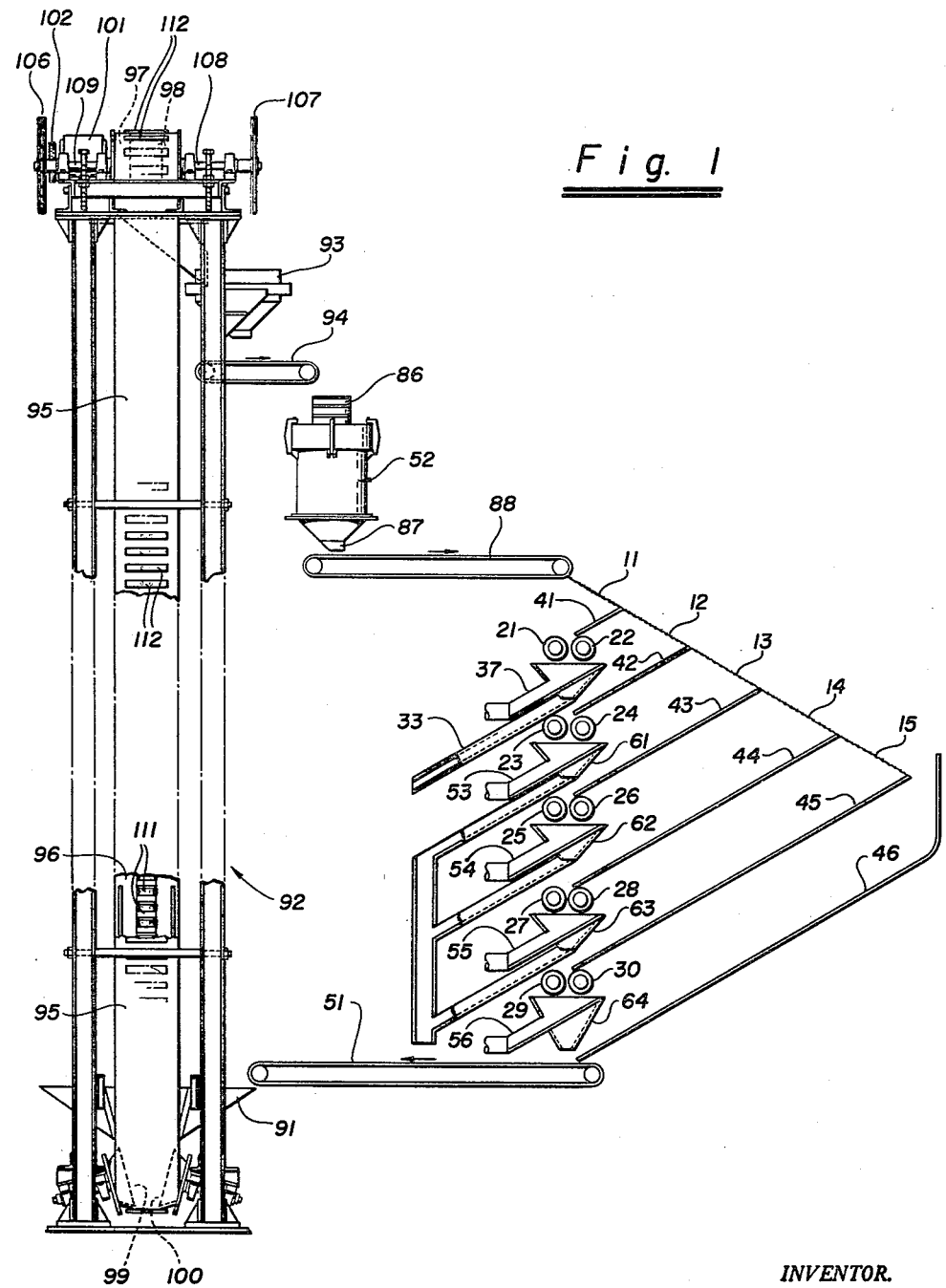
FIGURE 1 is a side elevation in more or less diagrammatic form of a three dimensional particle size classifier constructed in accordance with the present invention.
Figure 2:
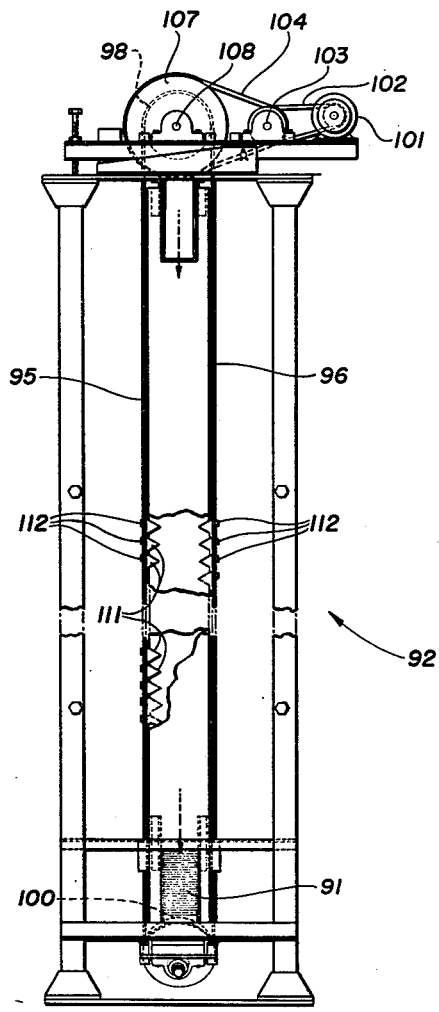
FIGURE 2 is a side elevation of an elevator forming part of the apparatus with portions broken away to show internal structure.

Controlled grading of several groups of particles is here obtained by using a series of classifying screens 11, 12, 13, 14, and 15, see FIGURE 1, in conjunction with a series of pairs of rollers 21 and 22, 23 and 24, 25 and 26, 27 and 28, and 29 and 30. Screens 11 to 15 are preferably graduated in passage size to pass material of successively greater size and the spacings between each pair of rollers 21—30 is less than the passage size of its associated screen and arranged with such spacings increasing successively to pass material of successively greater size, thereby effecting in each associated screen and pair of rollers a three dimensional grading of particles with the particles retained on the pairs of rollers being graded into groups of progressively greater particle size.

Figure 5:
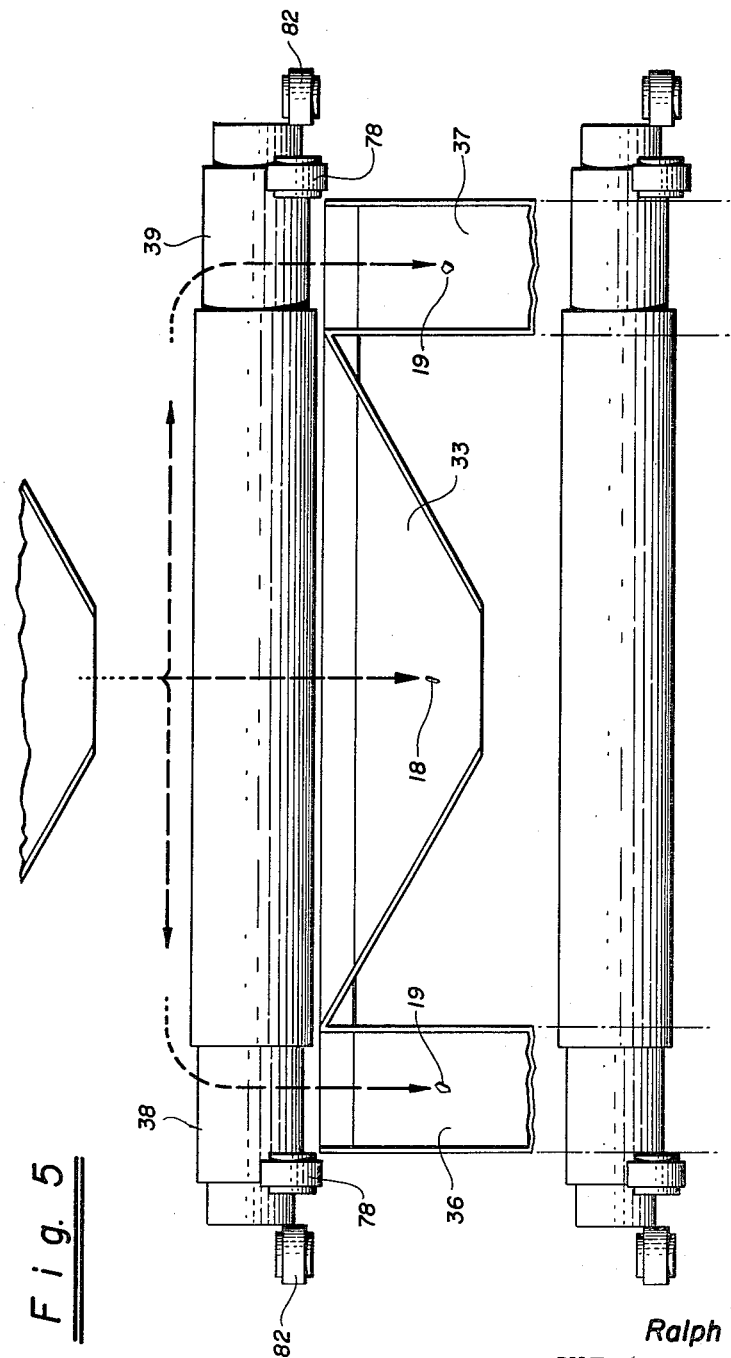
FIGURE 5 is a fragmentary front elevation of portions of the assembly illustrated in FIGURE 4.

As will be seen from FIGURE 1 screens 11 to 15 are arranged in edge to edge contiguous relation on an inclined plane so that all material which will not pass through the openings in screen 11 will be deposited on screen 12 which has slightly larger openings and, material not passing through screen 12 will travel on to screen 13 and so forth. Finally, material too large to pass through screen 15 is returned for re-crushing and classifying. By way of example, screen 11 may be 40 mesh which will pass particles having at least two dimensions up to 0.0164 inch; screen 12 may be 30 mesh which will pass particles up to 0.0232 inch; screen 13 may be 20 mesh which will pass particles up to 0.0331 inch; screen 14 may be 16 mesh which will pass particles up to 0.046 inch; and screen 15 may be 12 mesh which will pass particles up to 0.065 inch. Rollers 21 and 22, in keeping with the foregoing screen sizes, may be set with a spacing of 0.010 inch which is the equivalent of 50 mesh screen. Accordingly, thin discs and flakes having a thickness of less than 0.010 inch will thus pass through rollers 21 and 22 as the material tumbles and rotates and travels lengthwise of the rollers. This material which passes between the rollers 21 and 22 is essentially a powder at this stage of the classifying system and is taken off by a collecting chute 33 mounted below the central portion of rollers 21 and 22. Material retained on rollers 21 and 22 will then have a particle size of between 40 and 50 mesh and this material travelling lengthwise of the rollers is taken off at the opposite ends of the rollers in hoppers 36 and 37, see FIGURE 5, for packaging. Preferably, the material passing screen 11 is delivered by a chute 41 to rollers 21 and 22 centrally of their length so that the material then tumbles and feeds to the opposite ends 38 and 39 of the rollers where the retained material is discharged into hoppers 36 and 37. Preferably, as seen in FIGURE 5, the opposite ends 38 and 39 of the rollers are reduced in diameter so as to open the space between the rollers for dropping out of the retained material into hoppers 36 and 37. In a similar manner chute 42 delivers material passing screen 12 to the central portion of rollers 23 and 24; chute 43 delivers material passing screen 13 to rollers 25 and 26; chute 44 delivers material passing screen 14 to rollers 27 and 28; chute 45 delivers material passing screen 15 to rollers 29 and 30; and chute 46 delivers material passing the end of screen 15 to conveyor 51 for return to the crusher 52 and then to the screens for reclassifying.

As above noted the discharge from the uppermost pair of rollers 21 and 22 is taken off as a powder or dust by chute 37. This material is useful in powdered form or it may be advantageously used for remelt in the carbide forming furnace as part of the charge so as to assist in the formation of the carbide material. In accordance with the above described arrangement, material passing through screen 12 will be larger than 40 mesh and smaller than 30 mesh and is fed by chute 42 to rollers 23 and 24 for further classifying. These two rollers may be set with a spacing of 0.015 inch so that material carried to the ends of rollers 23 and 24 will be larger than 0.015 (which is approximately the equivalent of but smaller than 40 mesh screen). Material so graded on rollers 23 and 24 is delivered into end hoppers 53. The next lower set of rollers 25 and 26 are here set apart by spacing of 0.022 inch which is approximately the same as but smaller than 30 mesh screen. Accordingly, the material retained on rollers 25 and 26 and delivered to end hoppers 54 will be graded between 20 and 30 mesh. The next lower set of rollers 27 and 28 are here set apart by a distance of 0.032 inch which is roughly equivalent to but smaller than 20 mesh screen. Accordingly, particles retained on rollers 27 and 28 and delivered to their end hoppers 55 will be graded between 16 and 20 mesh. The lowermost set of rollers 29 and 30 are here set apart by spacing of 0.045 inch which is roughly equivalent to but slightly smaller than 16 mesh and accordingly, particles retained on rollers 29 and 30 and delivered to their end hoppers 56 will be graded between 12 and 16 mesh.

The thin flakelike material which passes between rollers 23 and 24 is received in an underlying hopper and chute 61, and in a similar fashion material passing between rollers 25 and 26, rollers 27 and 28, and rollers 29 and 30, is received in underlying hopper and chutes 62, 63 and 64. As will be observed from FIGURE 1, chutes 61, 62, and 63 are connected to a common chute 65 which returns the material to conveyor 51 and chute 64 similarly delivers onto conveyor 51, so that reject material passing between the rollers 23—30 is returned to the crusher 52 for further processing and reclassifying.

The foregoing arrangement of sizes is furnished for purpose of illustration and for convenience is summarized in the following table:

*Particle Size Table*

| Screen 11 | Screen 12 | Screen 13 | Screen 14 | Screen 15 |
|---|---|---|---|---|
| 40 Mesh, 0.0164″ to 0.010″, Rollers 21 and 22. | 30 Mesh, 0.0232″ to 0.015″, Rollers 23 and 24. | 20 Mesh, 0.0331″ to 0.022″, Rollers 25 and 26. | 16 Mesh, 0.046″ to 0.032″, Rollers 27 and 28. | 12 Mesh, 0.065″ to 0.045″, Rollers 29 and 30. |

Figure 3:
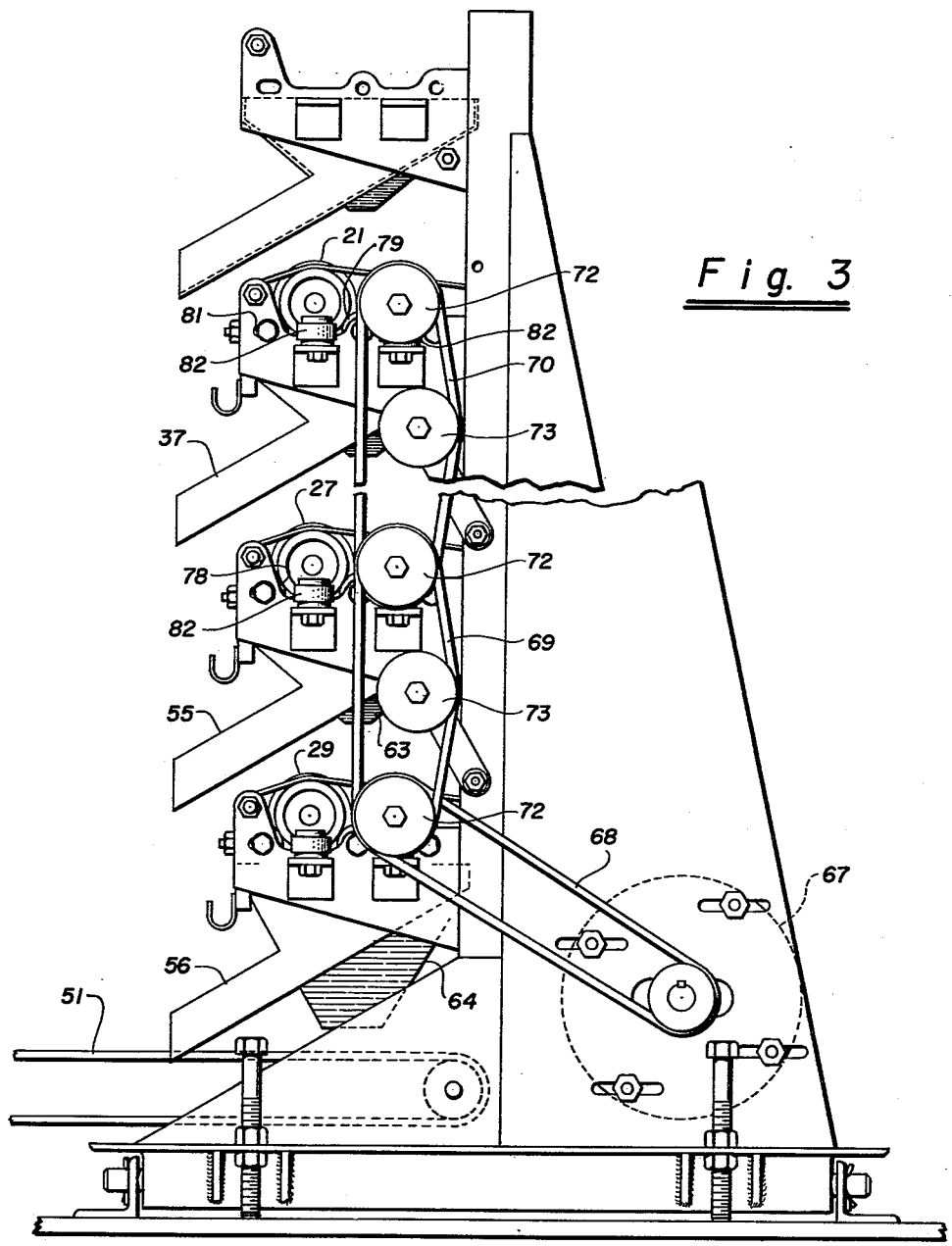
FIGURE 3 is an end elevation of a bank of rollers forming part of the apparatus, the assembly being broken and foreshortened to permit the use of an enlarged scale.
Figure 4:
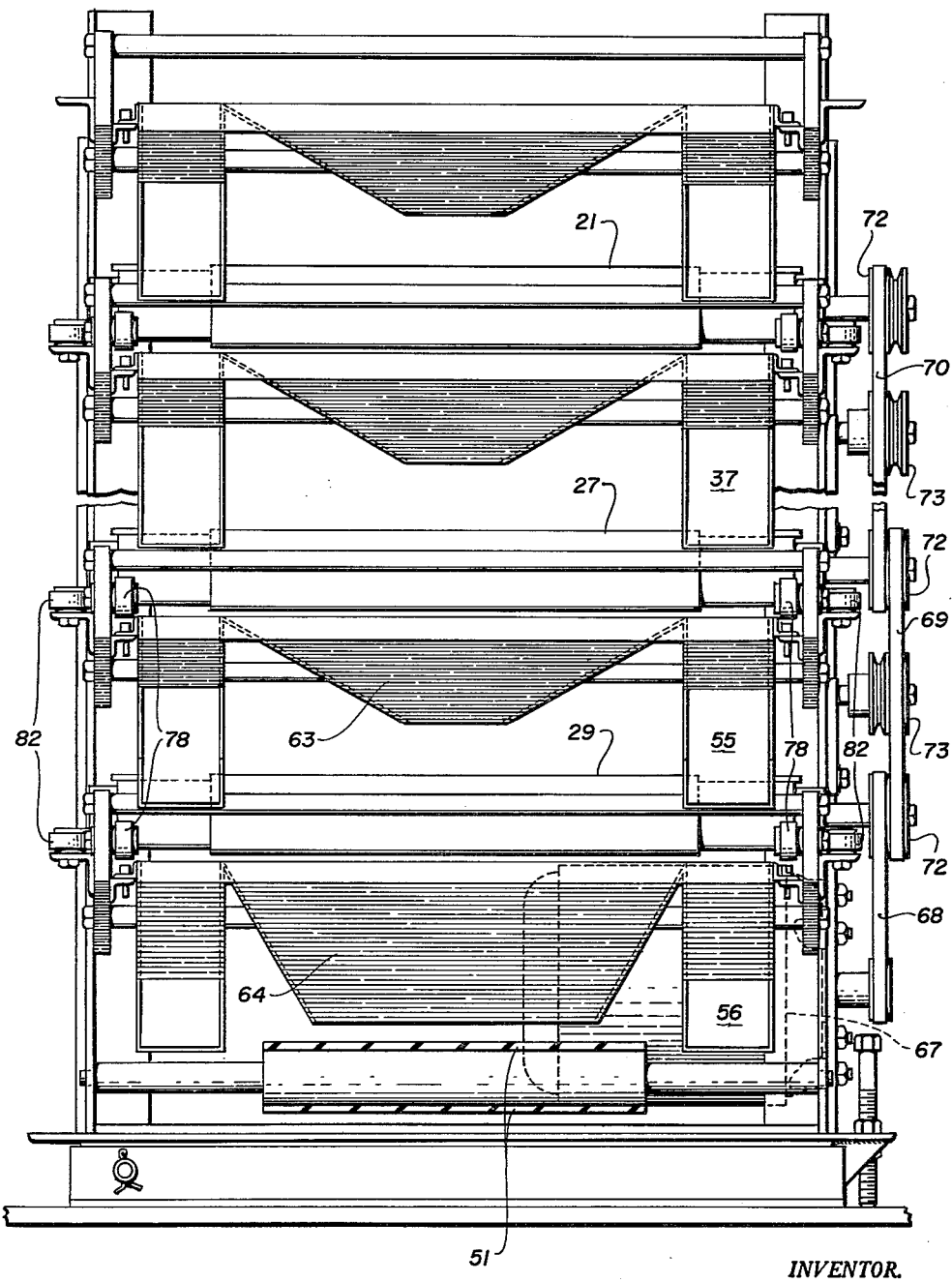
FIGURE 4 is a front elevation of the assembly illustrated in FIGURE 3.

With reference to FIGURES 3 and 4 it will be noted that one of each of the several pairs of rollers is driven by an electric motor 67 and a series of belts 68, 69 and 70 connected thereto. The driven rollers are here rollers 22, 24, 26, 28 and 30, being the righthand roller of each of the pairs illustrated in FIGURE 1. These rollers are provided with shaft extensions 71 on which are mounted drive pulleys 72 which are in turn engaged by belts 68—70, belt takeup pulleys 73 being also shown to maintain proper belt tightness. With reference to FIGURE 6 it will be further noted that each pair of rollers are provided with end trunnion shafts which are supported on three mounting rollers 78, 79 and 80. Roller 79 is here mounted on an adjustable slide 81 for setting the spacing between the rollers. As a feature of the present invention roller 22 is driven somewhat faster than roller 21 so as to provide the elevation and tumbling of the material in the vortex, and as here shown this differential drive is obtained by arranging trunnion shaft 77 of somewhat smaller diameter than trunnion shaft 76 so that a gear reduction is obtained in driving from trunnion 77 through idler 79 and trunnion 76. Also, preferably, in the present construction drive roller 22 is rubber coated while roller 21 is hard chrome plated so that the two rollers cooperate in the tumbling of the material in the vortex 32 and in the advancing of the retained particles along the length of the rollers to the end hoppers arranged for the removal of the graded material. The rollers may be supported against end-wise displacement by a series of end rollers 82.

Preferably, and as illustrated in FIGURE 1, the cooperating classifying screens and rollers are incorporated in a continuously functioning production unit including a crusher 52 and means for returning to the crusher for recrushing and classifying the relatively larger reject material received from the screens and rollers. Any form of crusher well known in the art may be used. I have here illustrated a centrifugal impact crusher developed especially for present use and which is the subject of a separate application being filed. Briefly, this crusher consists of a receiving hopper 86 for tungsten carbide and which deposits the incoming material onto a high speed motor driven centrifugal slinger (not shown) which hurls the masses of material against surrounding anvils to effect a breaking up of the material. The smaller particles thus formed then leave the outlet passage 87 for deposit onto a conveyor 88 for transportation to the screen assembly 11—15. The larger reject material is here transported from the classifying screens and rollers by conveyor 51 to the receiving hopper 91 of a vertical belt elevator 92 which delivers the returning material to an elevated hopper 93 from where the material is taken by conveyor 94 to the receiving hopper 86 of the crusher 52. Elevator 92 is of an inverted bucket type also specially designed for the present apparatus and is the subject of a separate application being filed. Briefly, the elevator consists of an endless belt having two vertical runs 95 and 96 which are entrained over and around a pair of laterally spaced belt pulleys 97 and 98 at the top of the elevator and around a pair of laterally spaced idler pulleys 99 and 100 at the bottom of the elevator. The upper pulleys 97 and 98 are driven by an electric motor 101 which is connected by chain drive 102 to a counter shaft 103, the latter being connected by individual chain drives 104 to individual chain sprockets 106 and 107 mounted on individual stub shafts 108 and 109 connecting and synchronously driving pulleys 97 and 98.

With reference to FIGURE 1, it will be noted that idler pulleys 99 and 100 are formed to provide a trough in the bottom of the belt for containing of material and for tumbling the material into individual buckets 111 which are secured to the inner face of runs 95 and 96, as the buckets 111 swing around the bottom of the elevator. In this fashion the buckets are readily filled with tungsten carbide material without pushing or digging or dragging the buckets through the material which would cause premature abrasion and wear. Preferably, the buckets 111 are made of rubber or equivalent tough resilient material capable of handling the hard, abrasive tungsten carbide. The buckets are secured in longitudinally spaced position on the belt by means of steel reinforcing straps 112 which are mounted at the outside face of the belt and secured to the buckets by screws or rivets or the like. The bottom receiving hopper 91 delivers the tungsten carbide material into the bottom trough provided by the belt. A hopper and chute 113 at the top of the conveyor receives the material discharged from buckets 111 as they round the top of the conveyor and deliver the material to the conveyor discharge hopper 93. Normally, the ungraded tungsten carbide material is received in hopper 91 from a primary crusher in the form of tungsten carbide pieces having a size roughly ranging from the size of pea gravel up to about one-half inch.

I claim:

1. A three-dimensional particle size classifier comprising, first and second classifying screens mounted for the successive passage thereover of material to be classified, said first screen being selected to pass therethrough particles each having two of its three dimensions smaller than a first pre-determined size, said second screen being selected to pass therethrough particles each having two of its three dimensions smaller than a second pre-determined size larger than said first size, a first pair of rollers mounted to receive therebetween material passing through said first screen and being spaced to pass therebetween particles having any one of its three dimensions less than a third pre-determined size less than said first size, a second pair of rollers mounted to receive therebetween material passing through said second screen and being spaced to pass therebetween particles having any one of its three dimensions less than a fourth pre-determined size less than said second pre-determined size and greater than said third size, thereby effecting a three-dimensional grading of said particles retained on said first and second pairs of rollers with the particles retained on said second pair of rollers being of uniformly greater size than the particles retained on said first pair of rollers.

2. A three-dimensional particle size classifier comprising, a series of classifying screens mounted for successive passage thereover of material to be classified with said screens being graduated in passage size to pass material of successively greater size, and a series of spaced substantially horizontal and substantially parallel pairs of rollers equal in number to the number of said screens with one pair of rollers associated with and arranged for receipt therebetween of material passing one of said screens, the spacing between each pair of rollers being less than the passage size of its associated screen and the spacings between said pairs of rollers increasing successively to pass material of successively greater size, thereby effecting in each associated screen and pair of rollers a three-dimensional grading of particles with the particles retained on said pairs of rollers being graded into groups of progressively greater particle size.

3. A three-dimensional particle size classifier as characterized in claim 2 wherein each of said pairs of rollers define a vortex therebetween for receiving said material and including means rotating said rollers at different speeds so as to elevate and tumble the material in each vortex.

4. A three-dimensional particle size classifier comprising, a material classifying screen passing therethrough particles each having two of its three dimensions smaller than a first pre-determined size, a pair of substantially parallel and substantially horizontally mounted elongated rollers defining a vortex therebetween, means depositing material passing through said screen into said vortex medially of the length of said rollers, means rotating said rollers at different speeds so as to tumble the material in said vortex and work the material retained in said vortex towards the opposite ends of said rollers, said rollers being spaced to pass therebetween particles having any of its three dimensions less than a second pre-determined size less than said first size, whereby particles retained on said rollers will have two out of three dimensions graded between said first and second sizes and all of its dimensions greater than said second size thereby eliminating from the retained material flakes and slivers having a minimum dimension less than said second spacing, and means collecting material retained on said rollers from the opposite ends thereof.

5. A three-dimensional particle size classifier comprising, a material crushing machine delivering material in a variety of particle sizes, a series of classifying screens mounted for receipt and successive passage thereover of crushed material from said machine with said screens being graduated in passage size to pass material of successively greater size, a series of spaced substantially horizontal and substantially parallel pairs of rollers equal in number to the number of said screens with one pair of rollers associated with and arranged for receipt thereby of material passing one of said screens, the spacing between each pair of rollers being less than the passage size of its associated screen and the spacings between said pairs of rollers increasing successively to pass material of successively greater size thereby effecting in each associated screen and pair of rollers a three-dimensional grading of particles with the particles retained on said series of pairs of rollers being graded into groups of particles of progressively greater size, means collecting graded material from said rollers, and means returning to said crushing machine for recrushing and classifying the relatively larger reject material passed between a relatively downstream pair of said rollers.

6. A three dimensional particle size classifier as characterized in claim 5 wherein each of said rollers is of elongated form and each of said pairs of rollers define a material handling vortex therebetween, means delivering material from each screen to the vortex of the associated pair of rollers medially of the length of the rollers, and means rotating the rollers of each pair at different speeds so as to elevate and tumble the material in each vortex and work the material retained in each vortex towards the opposite ends of the rollers, said collecting means being arranged to remove the graded material from the opposite ends of each pair of rollers.

7. A three-dimensional particle size classifier comprising, a material classifying screen passing therethrough particles having two of its three dimensions smaller than a pre-determined size determined by the openings in said screen, a pair of rollers mounted in spaced side by side substantially horizontal relation to define between adjacent upper peripheries thereof a particle receiving chamber mounted to receive particles passing through said screen, means rotating said rollers in similar directions of rotation so as to tumble the particles in said chamber and cause the gravitation through the space between said rollers of particles having any dimension less than the transverse dimension of said space, said transverse space dimension being less than said screen opening size to thereby perform a sequential grading function retaining on said rollers particles having two out of three dimensions graded between the dimensions of said screen openings and space and all of their dimensions greater than said space dimension thereby eliminating from the retained material flakes having a minimum dimension less than said space dimension.

8. The method of grading and selecting particulate material of substantial 3-dimensional form which consists in first passing said material through a material classifying screen to obtain particles each having two of its three dimensions smaller than a pre-determined screen opening size, then depositing said particles between adjacent upper peripheries of a pair of rollers mounted in side by side substantially horizontal relation and driven to tumble said material in the space therebetween and being spaced by a predetermined minimum dimension to pass particles having any dimension less than said space dimension whereby particles retained on said rollers will have two out of three dimensions graded between said screen opening size and said space dimension and all of their dimensions greater than said space dimension thereby eliminating from said retained material flakes having a minimum dimension less than said space dimension.

References Cited in the file of this patent

UNITED STATES PATENTS

| | | |
|---|---|---|
| 317,412 | Phelps | May 5, 1885 |
| 2,370,539 | Hodecker | Feb. 27, 1945 |
| 2,835,452 | Cline | May 20, 1958 |

FOREIGN PATENTS

| | | |
|---|---|---|
| 1,171,721 | France | Oct. 6, 1958 |